United States Patent [19]

Ribouleau

[11] 3,889,853

[45] June 17, 1975

[54] DISTRIBUTING APPARATUS FOR AGRICULTURAL PURPOSES

[76] Inventor: Edmond Ribouleau, Largeasse 79, 240 L'Absie, France

[22] Filed: Mar. 20, 1974

[21] Appl. No.: 453,167

[30] Foreign Application Priority Data
Mar. 21, 1973 France .............................. 73.10071

[52] U.S. Cl. .................. 222/177; 222/272; 222/273
[51] Int. Cl. ........................................... A01c 15/00
[58] Field of Search .................. 222/177, 240–242, 222/272–274, 252, 254

[56] References Cited
UNITED STATES PATENTS

| | | | |
|---|---|---|---|
| 227,359 | 5/1880 | Humphrey | 222/274 X |
| 529,099 | 11/1894 | Aspinwall | 222/240 |
| 1,023,752 | 4/1912 | Oswalt | 222/272 X |
| 1,406,233 | 2/1922 | Skeldon | 222/240 X |
| 3,180,525 | 4/1965 | Fabian et al. | 222/272 X |

Primary Examiner—Stanley H. Tollberg
Assistant Examiner—John P. Shannon
Attorney, Agent, or Firm—Eric P. Schellin

[57] ABSTRACT

A hooding is disposed in the hopper of the apparatus and defines a chamber isolated from the material to be distributed. A distributor wheel and two Archimedean screws, having their output ends adjacent the wheel, are mounted to rotate in the chamber. The hooding defines two openings with the bottom of the hopper respectively adjacent the input ends of the screws for allowing access of the material to the wheel. The wheel has finger members which sweep alongside a circular recess so that the wheel acts as an elevator for raising the material to the inlet end of a spout which inlet end is located above the bottom of the hopper, the spout distributing the material over the ground. The wheel is driven at a speed proportional to the speed of displacement of the apparatus over the ground.

14 Claims, 7 Drawing Figures

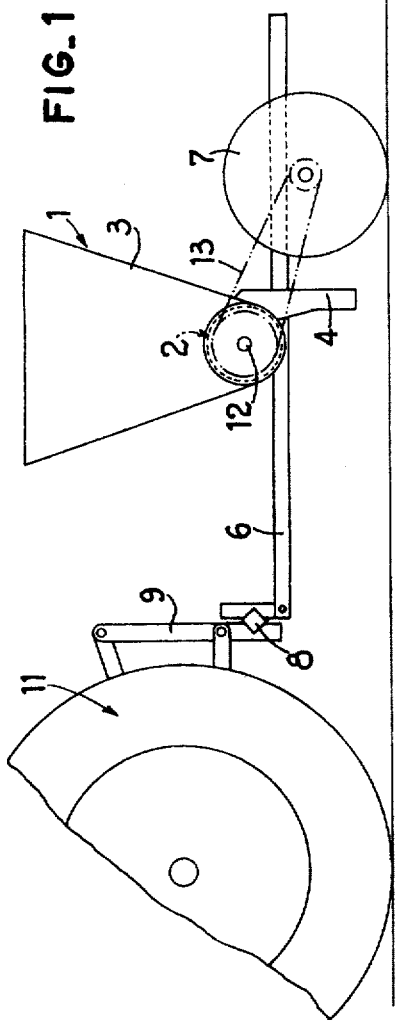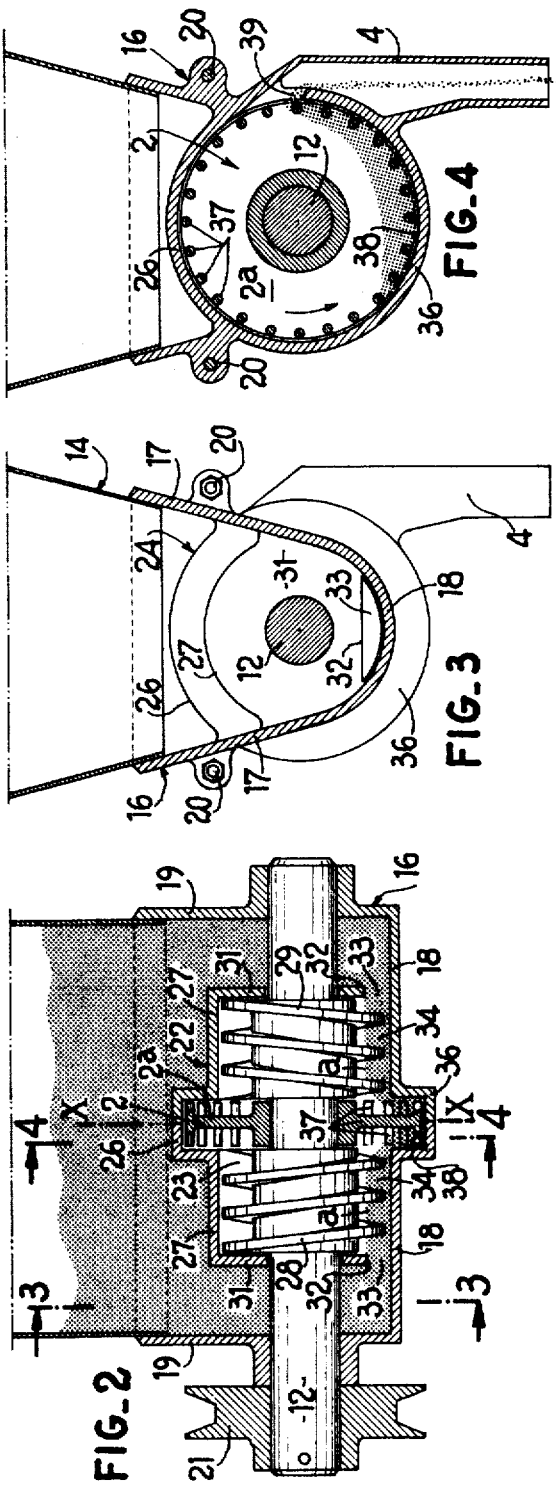

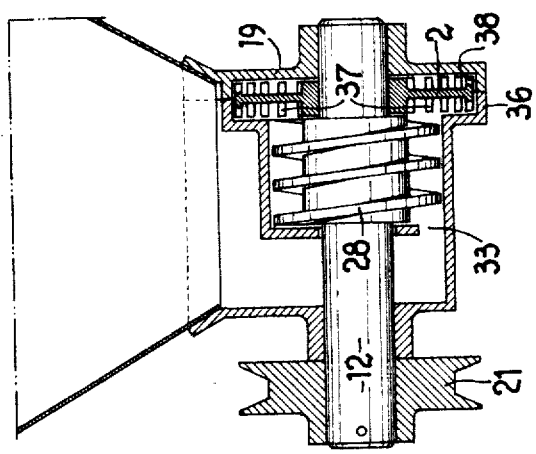
FIG._7
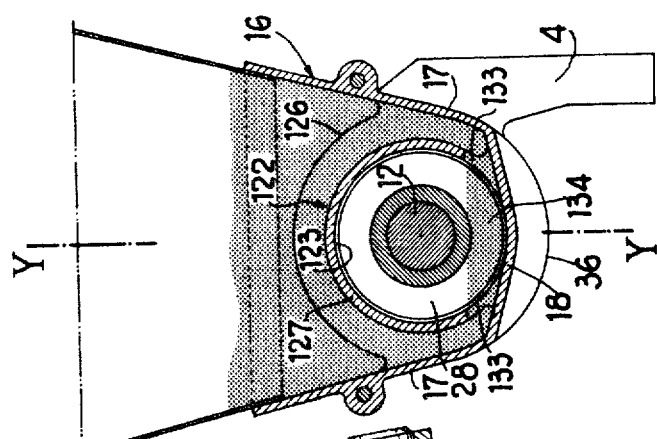
FIG._6
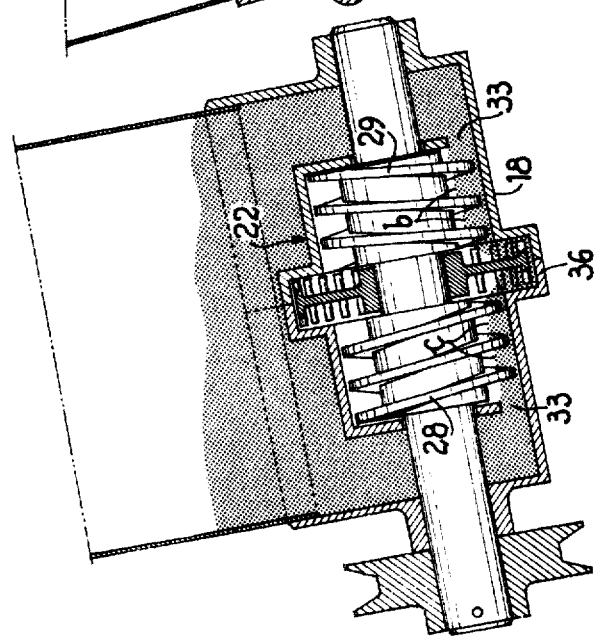
FIG._5

DISTRIBUTING APPARATUS FOR AGRICULTURAL PURPOSES

The present invention relates to distributing apparatus for distributing over the ground a pulverulent or granular material, and in particular granules or powder, for the destruction of animals or plant parasites or for the fertilization of the ground comprising at least one Archimedean screw disposed within a hooding in the lower part of a hopper for feeding the material to a spout through which the material is distributed over the ground.

An object of the invention is to provide an apparatus of this type which is capable of effecting an even distribution and is capable of being rendered independent of the speed of travel of the chassis which is attached to, or carried by, a tractor, and on which the apparatus is fixed.

The invention provides an apparatus wherein the hooding defines with the bottom of the hopper at least one opening for giving the material access to an axial passageway formed in the bottom of the hopper and communicating with a distributor wheel which is contained within the hooding and is adjacent the output end of the screw or each screw.

An invariable amount of material, determined by the input section of the passageway formed above the bottom of the hopper and by the pitch of the screw or screws, is displaced toward the distributor wheel which takes up the material in a perfectly even manner so that if there is a given transmission ratio between the drive shaft of this screw or screws and the wheels of the chassis driven by friction against the ground the amount of material distributed is invariable during an advance of the machine through a given distance which is essential in the treatment of an agricultural ground with insecticides or fertilizers in the form of microgranules or powder at low doses per hectare.

It is advantageous to provide a distributor wheel which is placed in a centre position above the bottom of the hopper and two Archimedean screws of opposite pitch forming with the hooding an assembly which is disposed symmetrically with respect to the vertical median plane of the distributor wheel. In this arrangement, indeed, the regularity of the distribution and of the spreading is ensured even when the apparatus assumes an inclination owing to unevenness of the ground over which the chassis travels, since the excess material introduced in the circular cavity receiving the distributor wheel owing to the slope which promoted the flow on one side of the wheel is exactly compensated for by the insufficient amount of material whose flow is, on the other side of the wheel, countered by the slope of opposite direction.

It is obviously possible to modify the rate of material distributed per unit length of travel by modifying the transmission ratio between the shaft of the distributor wheel and the wheels of the chassis bearing on the ground which have a driving function. This variation in the ratio may be achieved by any means for example by providing interchangeable pulleys or gears or an extensible pulley.

Further features and advantages of the invention will be apparent from the ensuing description with reference to the accompanying drawings.

In the drawings:

FIG. 1 is a diagrammatic elevational view of a distributing apparatus according to the invention carried on a chassis connected to a tractor;

FIG. 2 is a cross-sectional view of the distributor mechanism of the apparatus shown in FIG. 1;

FIGS. 3 and 4 are sectional views taken on lines 3—3 and 4—4 of FIG. 2;

FIG. 5 is a view corresponding to FIG. 2 of the position of the apparatus of a sloping ground;

FIG. 6 is a cross-sectional view of a modification, and

FIG. 7 is an axial sectional view of another modification having a single screw.

The distributing apparatus 1 shown in FIG. 1, which comprises a distributor wheel 2 mounted in the lower part of a hopper 3 for spreading on the ground by way of a vertical spout 4 the powdered or granular material contained in the hopper 3, is mounted on a chassis 6 which is provided at the rear with wheels 7 which bear on the ground and connected in the front through a tool carrier 8 to the raising system 9 of a tractor 11.

The wheels 7, which are driven by frictional contact with the ground, drive the shaft 12 of the distributor wheel 2 through a V-belt transmission 13 which affords a given ratio between the speed of travel of the chassis 6 and the speed of rotation of the distributor wheel 2.

The hopper 1 comprises an upper part 14 of the illustrated shape with which is assembled a lower element 16 having a cylindro-prismatic shape and including two convergent side walls 17, a part-cylindrical bottom wall 18 and two vertical side walls 19 through which extends the shaft 12 which carries, in addition to the distributor wheel 2, a V-grooved pulley 21 driven by the belt 13 (FIG. 1).

The distributor wheel 2 is disposed in the median plane X—X of the space defined by the two side walls 19 of the lower element 16 of the hopper. Two half-shells constituting the lower element 16 are assembled on the plane X—X by means of bolts 20.

Provided inside the element 16 is a hooding 22 which is disposed symmetrically with respect to the plane X—X around the shaft 12. This hooding, which defines a volume 23 isolated from the material contained in the hopper, includes a generally part-cylindrical top portion 24 which is applied in a sealed manner to the side walls 17 of the element 16 and which includes a centre portion 26 of large diameter in which the distributor wheel 2 is disposed and two lateral portions 27 of smaller diameter which cover two Archimedean screws 28 and 29 having opposite pitches which are fixed to, or formed on, the shaft 12, one end of the screws being adjacent the distributor wheel 2 and the other end being covered by a vertical partition wall 31 of the hooding which is applied in a sealed manner against the walls 17 of the lower element 16 and which is spaced from the corresponding side wall 19 and thus forms a passage with the wall 19 which extends down to the bottom wall 18. The lower edge 32 of each partition wall 31 is horizontal and vertically spaced from the bottom wall 18 and defines an opening 33 thorugh which the material from the hopper can pass and travel through a passageway 34 adjoining the bottom wall 18 owing to the action of the threads of the screw 28 or 29 and thereafter fall into a circular housing 36 which defines a projection with respect to the bottom wall 18 of the hopper and in which the material is taken up by radial finger members 37 which sweep across the bottom wall 38 of this housing and are fixed or formed with an even spacing adjacent the periphery of the distributor wheel 2 and extend symmetrically on each side of the disc 2a of this wheel. It will be observed that the edges 32 are no higher than a horizontal plane tangent to the roots of the threads of the screws 28 and 29.

The wheel 2 thus performs the function of an elevator by moving the grains of material in the recess defined by the housing 36 up to the level, approximately coinciding with the axis of the shaft 12, of an orifice 39 which is formed in the circular housing 36 and open onto the upper part of a spout 4 secured to or formed on the element 16. The stream of material falling out of the orifice 39 and through the spout 4 ensures a uniform spreading rate per unit length of travel of the apparatus owing to the slip-free transmission between the driving wheels 7 and the shaft 12 of the distributor wheel and moreover to the invariable volume of material, determined by the pitch of the screws and the level of the lower edge 32 of the partition walls 31, displaced upon each revolution of the screws 28, 29 and to the regular transfer effected by the finger members 37 of the distributor wheel 2.

The evenness of the spreading is not affected by any possible slope in the ground over which the chassis 6 travels. Indeed, as can be seen in FIG. 5, the flow by the effect of gravity is facilitated on one side corresponding to the screw 29 where the slope promotes the flow, but on the other hand retarded on the side corresponding to the screw 28 where the slope counters the flow. Whereas in the case of a horizontal ground (FIG. 2) the level $a$ of the material in the passageway 34 is the same on each side of the distributor wheel 2, the level $b$ between the threads of the screw 29 is higher than the level $c$ between the threads of the screws 28, but as the volumes displaced by the respective screws are regrouped in the cavity of the housing 36, the excess amount of material displaced by the screw 29 is compensated for by the insufficient amount of the material driven along by the screw 28 so that the sum effect of the flows of material is the same on flat ground as on sloping ground. Moreover, owing to the arrangement of the openings 33 between the hooding 22 and the bottom 18 of the hopper, a rearward slope of the chassis 6 is without influence on the level of the grains between the threads of the screws 28 and 29.

In the modification shown in FIG. 6, the hooding 122 extends between the two walls 19 of the lower element 16, the partition wall 31 shown in FIG. 2 being eliminated. The part-cylindrical portions 127 of small diameter of the hooding are then spaced from the walls 17 so as to form passages to allow the material to reach the axial passageway 134 by way of two openings 133 formed in each part 127 at its end opposed to the distributor wheel 2 on each side of the main plane Y—Y containing the axis of the shaft 12.

FIG. 7 shows a modification of the arrangement shown in FIG. 2 in which the screw 29 has been eliminated. The distributor wheel 2 is then located adjacent one of the side walls 19 of the element 16.

In order to modify the transmission ratio between the wheels 7 of the chassis 6 and the shaft 12 a speed variator may be provided, for example in the form of a conventional pulley having a V-groove defined by two axially adjustable cheek members. It is also possible to employ interchangeable pulleys or gearwheels or any other like means.

Having now described my invention what I claim as new and desire to secure by Letters Patent is:

1. An apparatus for distributing pulverulent or granular material over a ground, comprising a hopper for the material, at least one Archimedean screw mounted to rotate about an axis in a lower part of the hopper, a distributor wheel adjacent an output end of the screw and combined with the screw, a hooding completely closing the screw and wheel off from the interior of the hopper except for a portion of the hooding which has a lower edge which defines with a bottom portion of the hopper an opening located below said axis, the hooding defining with a side portion of the hopper a passage putting the opening in communication with the interior of the hopper above the hooding, the opening being adjacent an input end of the screw opposed to said output end and allowing the material in the passage access to the wheel by way of the interior of the hooding in a region adjoining the bottom portion of the hopper, a spout for directing the material onto the ground, the spout having an input orifice communicating with the inside of the hooding and positioned to cooperate with the wheel for transferring the material from the wheel to the ground by way of the spout, and means for rotating the screw and the wheel.

2. An apparatus as claimed in claim 1, comprising a part-circular housing outwardly projecting from a bottom part of the hopper which part includes said bottom portion, the housing defining a part-cylindrical inner surface, finger members which are evenly spaced apart on and extend transversely of the distributor wheel which wheel performs the function of an elevator for supplying the material to the input orifice of the spout which orifice is located above the bottom of the hopper, the finger members being capable of sweeping alongside said inner surface.

3. An apparatus as claimed in claim 2, wherein the wheel comprises a disc and the finger members of the wheel extend symmetrically on each side of the plane of the disc.

4. An apparatus as claimed in claim 2, wherein the top of the hooding comprises a large-diameter part-cylindrical portion which defines with the part-circular housing a continuous cavity in which the distributor wheel is disposed.

5. An apparatus as claimed in claim 4, wherein the screw is surrounded by a part-cylindrical portion of the hooding which is of smaller diameter than the large-diameter portion.

6. An apparatus as claimed in claim 1, wherein the hooding comprises a partition wall which is located adjacent the input end of the screw and extends transversely of said axis of constitutes said hooding portion which has said lower edge which defines said opening, said partition wall defining said passage with the side portion of the hopper.

7. An apparatus as claimed in claim 1, wherein the hooding comprises a part-cylindrical portion which surrounds the screw and has said lower edge defining said opening.

8. An apparatus as claimed in claim 4, wherein a single Archimedean screw is provided and the distributor wheel has a side which is opposed to the screw and is adjacent a wall of the hopper which hopper wall defines a part of the part-circular housing.

9. An apparatus as claimed in claim 1, wherein the screw has a thread and a root between the thread and said edge of said opening is no higher than a plane tangent to the root of the thread of the screw.

10. An apparatus as claimed in claim 1, comprising a chassis provided with wheels in contact with the ground, the chassis carrying the hopper, the means for driving the distributor wheel being drivenly connected to the wheels of the chassis through a transmission.

11. An apparatus as claimed in claim 10, comprising a speed variator for rendering the transmission ratio between the wheels of the chassis and the driving means variable.

12. An apparatus for distributing pulverulent or granular material over a ground, comprising a hopper for the material, a distributor wheel, Archimedean screws respectively combined with and extending from opposite sides of the wheel and each having an output end adjacent the wheel and an input end opposed to the output end, the wheel and screws being mounted to rotate about an axis in a lower part of the hopper, means for rotating the wheel and the screws, a hooding completely closing off the screws and the wheel from the interior of the hopper except for two portions of the hooding which hooding portions have lower edges which define with a bottom portion of the hopper two openings located below said axis and respectively adjacent the input ends of the screws, the two openings allowing the material in the corresponding passages access to the wheel by way of the interior of the hooding in a region adjoining the bottom portion of the hopper, and a spout for directing the material onto the ground, the spout having an input orifice communicating with the interior of the hooding and positioned to cooperate with the wheel for transferring the material from the wheel to the ground by way of the spout, the hooding defining with two side portions of the hopper two passages respectively putting the two openings in communication with the interior of the hopper above the hooding.

13. An apparatus as claimed in claim 12, wherein the screws have threads and roots between the threads and said edge of each of said openings is no higher than a plane tangent to the root of the thread of the corresponding screw.

14. An apparatus as claimed in claim 12, wherein there are two of said openings adjacent each input end of each screw on opposite sides of said axis and two of said passages defined by the hooding with side portions of the hopper and corresponding to the two openings for the input end of each screw.

* * * * *